United States Patent [19]

Müller et al.

[11] Patent Number: 5,275,250

[45] Date of Patent: Jan. 4, 1994

[54] VEHICLE STEERING CONTROL DEVICE

[75] Inventors: Jacques Müller, Reconvilier; Claude Béroud, Court; Thomas Edye, Boudry, all of Switzerland

[73] Assignee: SMH Management Services, Biel, Switzerland

[21] Appl. No.: 966,551

[22] Filed: Oct. 26, 1992

[30] Foreign Application Priority Data

Oct. 29, 1991 [FR] France .................. 91 13458

[51] Int. Cl.$^5$ ............................................. B62D 5/00
[52] U.S. Cl. .................... 180/79; 180/79.1; 74/625
[58] Field of Search ............... 180/79, 133, 141, 142, 180/151, 154, 79.1; 74/498, 504, 526, 625

[56] References Cited

U.S. PATENT DOCUMENTS 4,880,074  11/1989  Matsumoto ................. 180/142
4,940,105  7/1990  Matsunaga et al. .......... 180/133

FOREIGN PATENT DOCUMENTS 0400684  12/1990  European Pat. Off. .
0447626  9/1991  European Pat. Off. .
355151  6/1922  Fed. Rep. of Germany .
4142055  7/1992  Fed. Rep. of Germany .

Primary Examiner—Margaret A. Focarino
Assistant Examiner—Victor E. Johnson
Attorney, Agent, or Firm—Griffin, Butler, Whisenhunt & Kurtossy

[57] ABSTRACT

The vehicle steering control device comprises a steering control member actuatable by the driver and a slaving device comprising two sensors each supplying a detection signal representative, respectively, of the angular position of the vehicle's steerable wheels and of the position of the control member, a motor for pivoting the steerable wheels in response to a control signal, and a slaving circuit producing this control signal in response to the detection signals. The steering control device further comprises a coupling member able to mechanically connect the steering control member to the steerable wheels when the slaving device is not working properly whereby, in such an event, the driver retains control over his vehicle's steering.

4 Claims, 16 Drawing Sheets

VEHICLE STEERING CONTROL DEVICE

The present invention concerns a device for controlling the steering of a vehicle having at least one steerable wheel angularly mobile relative to a pivotal axis to determine the direction of travel of the vehicle, and more particularly a device of this kind having great operational safety.

BACKGROUND OF THE INVENTION

As most vehicles of this kind have two steerable wheels, and sometimes even more, reference will only be made in the following description to "the steerable wheels" so as not unduly to clutter up the description. But it will readily be seen that the present invention applies without change to vehicles having only one steerable wheel.

The driver of such a vehicle is obviously provided with a steering control member that he can actuate to cause the steerable wheels of his vehicle to pivot in relation to their pivotal axes, and hence to steer the vehicle. In most cases this member consists of a steering wheel which the driver can rotate about an axis. In other cases, this member consists not of a steering wheel but, for example, of a hand-actuated stick that the driver of the vehicle can move, parallel to itself or by causing it to pivot about an axis, in a plane which is, for example, perpendicular to the longitudinal axis of the vehicle.

In most vehicles of the above-defined kind, the slaving of the angular position of the steerable wheels to the position of the steering control member is performed by a purely mechanical device.

It has already been proposed to produce such slaving by means of a device having an electric or electronic slaving circuit that controls a motor mechanically linked to the steerable wheels in response to electric signals that are respectively representative of the pivotal angle of these wheels and of the position of the steering control member, these signals being supplied to the circuit by position sensors that are mechanically linked to said wheels and to said member, respectively.

In the remainder of this description, such a device will be termed "electric slaving device" and the electric or electronic circuit it comprises will be termed "slaving circuit".

In a steering control device using such an electric slaving device, there is no mechanical link between the vehicle's steerable wheels and its steering control member.

It should be noted that, throughout the present description, the term "mechanical link" between a first element and a second element, here the steerable wheels on the one hand and the steering control member on the other hand, must be understood to mean a functional link entirely made up of mechanical components and whereby any movement by one of the elements results in a corresponding movement by the other element, and not to mean the link that merely results from the fact that these two elements form part of the same vehicle.

A vehicle steering control device having an electric slaving device suffers from the major drawback of depriving the vehicle's driver of all control over the steering of the vehicle in case of faulty operation of the electric slaving device, the term faulty operation obviously applying also to a complete breakdown of the device. Such faulty operation of the electric slaving device could for instance be caused by a substantial drop, or by the complete fading out, of its supply voltage or by a failure of one of the components of the slaving circuit or of one of the position sensors.

An object of the present invention is to propose a vehicle steering control device which does not suffer from the drawback of the above-described known device, i.e. a device that enables the vehicle's driver to retain control of the steering of the vehicle even in the case of faulty operation of the electric slaving device.

SUMMARY OF THE INVENTION

This object is achieved by the device according to the invention, which is a device for controlling the steering of a vehicle having at least one steerable wheel that is angularly mobile relative to a pivotal axis to determine the direction of travel of the vehicle, this steering control device comprising a steering control member actuatable by the driver of said vehicle to steer said vehicle and a device for electrically slaving the angular position of said wheel to the position of said steering control member, which includes a first position detector mechanically coupled to said wheel to produce a first detection signal representative of the angular position of said wheel relative to said pivotal axis, a second position detector mechanically coupled to said steering control member to produce a second detection signal representative of the position of said steering control member, motor means mechanically coupled to said wheel to cause it to pivot about said pivotal axis in response to a control signal, and a slaving circuit producing said control signal in response to said first and second detection signals.

According to the invention, this steering control device is characterized in that it further comprises first means mechanically connected to the vehicle steering control member, second means mechanically connected to the steerable wheel, and coupling means for mechanically connecting said first and second means in case of faulty operation of the device for electrically slaving the angular position of the steerable wheel to the position of the steering control member.

As a result of the characterizing features of the steering control device according to the invention, the driver of the vehicle retains control of the latter's steering even in case of faulty operation of the electric slaving device.

In one embodiment of the steering control device according to the invention, the device is characterized in that:

said first means comprise first mechanical member solid with said steering control member, said second means comprise a second mechanical member located near said first mechanical member and mechanically connected to said wheel, and means for guiding said second mechanical member in such a way that its movements in response to the pivotal movements of said wheel are parallel to the movements of said first mechanical member, and said coupling means comprise a housing provided in one of said fist and second mechanical members and means solid with the other of said first and second mechanical members and arranged to cooperate with said housing to mechanically connect said first and second means in case of faulty operation of said slaving device.

In another embodiment of the steering control device according to the invention, the device is characterized in that said means that are solid with the other of said first and second mechanical members comprise a mobile coupling element and a locking member cooperating with said coupling element to maintain it in a first position in which it is not engaged in said housing when said slaving device is operating properly and to release it when said slaving device is not operating properly, said coupling means further comprising elastic means acting on said coupling element to move it, when released by said locking member, to a second position in which it is at least partially engaged in said housing.

Further objects and advantages of the device according to the present invention will become apparent from the description thereof which will be made with reference to the accompanying drawings.

DETAILED DESCRIPTION

Figure 1:
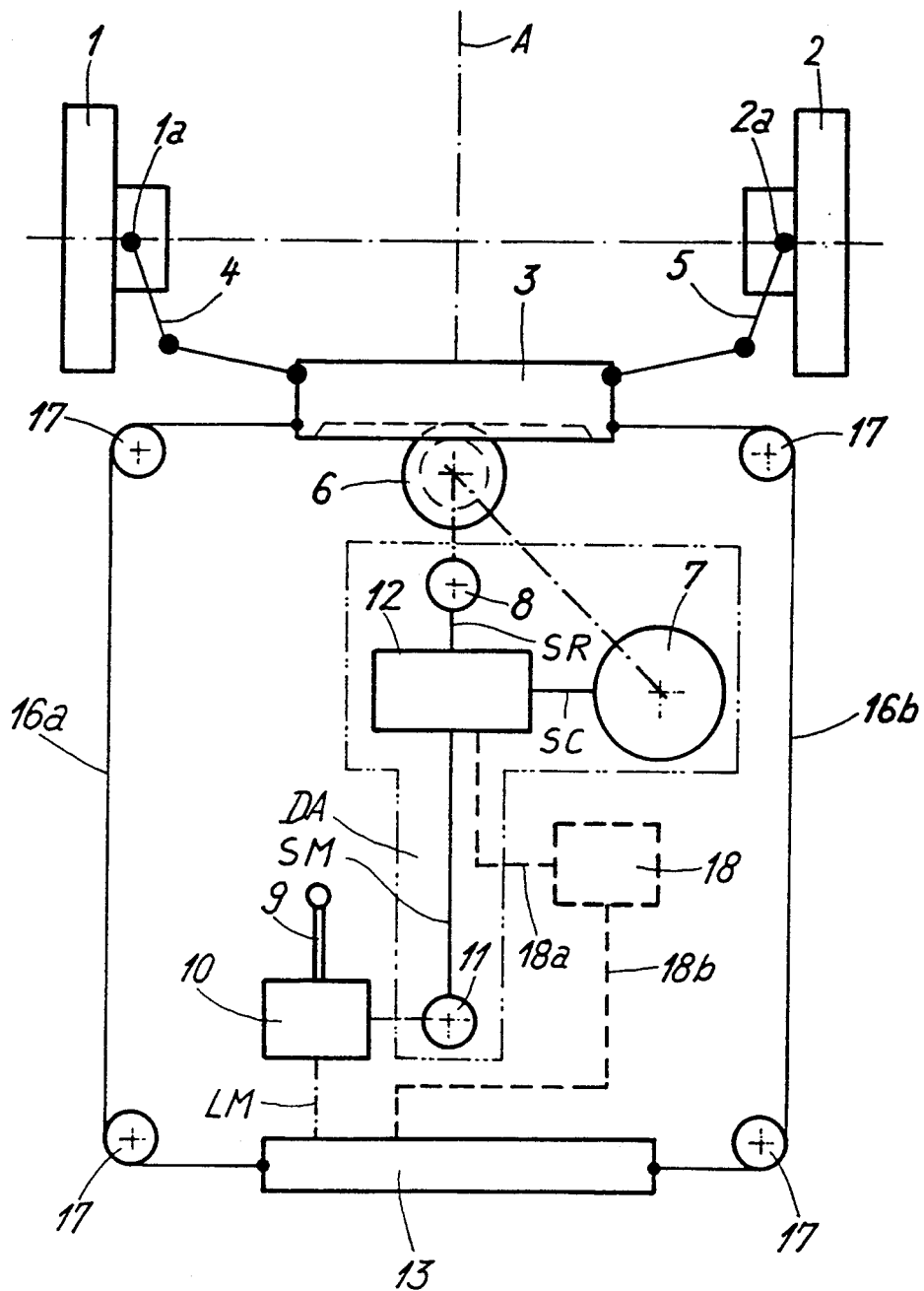
FIG. 1 illustrates schematically and partially a vehicle having a steering control device according to the invention.

The vehicle shown schematically and partially in FIG. 1 comprises two steerable wheels 1 and 2 fixed to an axle, not shown, in such manner that each wheel can turn about a respective pivot 1a, 2a having a substantially vertical axis, i.e. substantially perpendicular to the plane of FIG. 1.

Wheels 1 and 2 are both mechanically coupled to a rack 3 by articulated steering rods, designated by references 4 and 5, which are shown only schematically and will not be described in detail because such elements are well known to specialists.

Rack 3 is guided in slideways, not shown, allowing it to move lengthwise only, and rods 4 and 5 are arranged in such manner that wheels 1 and 2 will pivot in the same direction about axes 1a and 2a in response to this movement of rack 3.

The teeth of rack 3 mesh with a toothed wheel 6 itself coupled mechanically to the rotor of an electric motor 7. This rotor is not shown separately. In the illustrated example, toothed wheel 6 is connected to the rotor of motor 7 by a gear-train symbolized by a chain-dotted line, but it could also be fixed directly to the shaft of the rotor of motor 7.

A position sensor 8 supplying an electric signal representative of the angular position of wheels 1 and 2, and referenced SR, is connected mechanically, in the FIG. 1 example, to toothed wheel 6. It should be noted that sensor 8 may of course be connected mechanically to any point of the kinematic chain linking motor 7 to steerable wheels 1 and 2, provided this link is such as to provide the desired signal.

In the FIG. 1 vehicle, the steering control member that the driver can actuate to steer the vehicle consists of a hand-actuated stick 9 which, for example, extends substantially vertically from the upper surface of one of the elbow-rests of the driver's seat, in a position such that the driver may readily move it to the left or to the right to steer his vehicle.

Stick 9 is fixed to a support 10 that can travel in a slideway, not shown in FIG. 1, in a manner such that stick 9 may move parallel to itself, between two extreme positions, in a plane substantially vertical and perpendicular to the vehicle's longitudinal axis A.

The support 10 is coupled mechanically to a position sensor 11 which supplies an electric signal SM representative of the position of support 10 and hence of stick 9.

This electric signal SM that is representative of the position of stick 9 and the electric signal SR that is representative of the angular position of wheels 1 and 2, supplied by sensor 8, are applied to an electric or electronic slaving circuit 12.

Slaving circuit 12 will not be described here as it is a circuit which is well known to the man of the art and which moreover can be made in many different ways. Suffice it to say that this slaving circuit is adapted to respond to signals SM and SR to supply motor 7 with a control signal SC such that wheels 1 and 2 permanently have an angular position that corresponds to the position of stick 9.

The arrangement that includes position sensors 8 and 11, circuit 12 and motor 7 thus forms an electric slaving device as defined above, and is designated by reference DA.

The steering control device of FIG. 1 further comprises a coupling member 13, of which an example will be described later, which travels in a slideway, not shown in FIG. 1, located near and parallel to the slideway in which travels the support 10 of stick 9.

Coupling member 13 is connected mechanically to rack 3 by a pair of cables 16a and 16b extending over guide pulleys 17. The arrangement and the number of pulleys 17 in FIG. 1 is quite symbolic and arbitrary, their arrangement and their number depending obviously on the actual arrangement of the rack 3 and of the coupling member 13 in the vehicle.

Cables 16a and 16b may also be placed in sheaths that are deformable when flexed but rigid lengthwise. In such a case, no guide pulleys 17 are obviously provided.

Cables 16a and 16b may also be replaced by any other flexible link members such as belts.

Moreover, one of the cables 16a and 16b may be done away with and replaced by elastic reset means such as springs suitably secured to coupling member 13 and to rack 3, respectively.

As described in detail later, the support 10 of stick 9 and coupling member 13 are arranged in a manner such that there will be no mechanical link between them as long as slaving device DA is working properly, and in a manner such that a mechanical link establishes itself between support 10 and member 13 when slaving device DA is not working properly. This mechanical link is symbolized by a chain-dotted line referenced LM in FIG. 1.

In some forms of embodiment, the FIG. 1 device may further comprise a monitoring circuit able to detect whether or not slaving device DA is working properly, and to perform other functions, which may differ from one embodiment to another, in dependence on this detection. One such monitoring circuit is shown in dashed lines, referenced 18, in FIG. 1.

It will be seen that as long as slaving device DA is working properly, slaving circuit 12 responds to the signals SM and SR it receives, respectively, from position sensors 11 and 8 by supplying signal SC to motor 7. In response to this signal SC, motor 7's rotor rotates to cause wheels 1 and 2 to pivot via toothed wheel 6, rack 3 and steering rods 4 and 5 until wheels 1 and 2 take up an angular position corresponding to the position of stick 9.

At the same time, motor 7's rotor drives coupling member 13 via rack 3 and cables 16a and 16b.

For a reason which will be made clear later on in this description, coupling member 13 is connected to motor 7's rotor via rack 3 and cables 16a and 16b in a manner such that, when the driver moves stick 9 in one direction or the other to steer his vehicle, coupling member 13 moves in the same direction as stick 9, without there actually being a mechanical link between the latter and member 13.

When slaving device DA is not working properly, the mechanical link LM between coupling member 13 and the support 10 of stick 9 is established and any movement of stick 9 is then transmitted to wheels 1 and 2 via coupling member 13, cables 16a and 16b, rack 3 and steering rods 4 and 5. The vehicle's driver thus retains control of the vehicle's steering, even when slaving device DA is not working properly.

Figure 2:
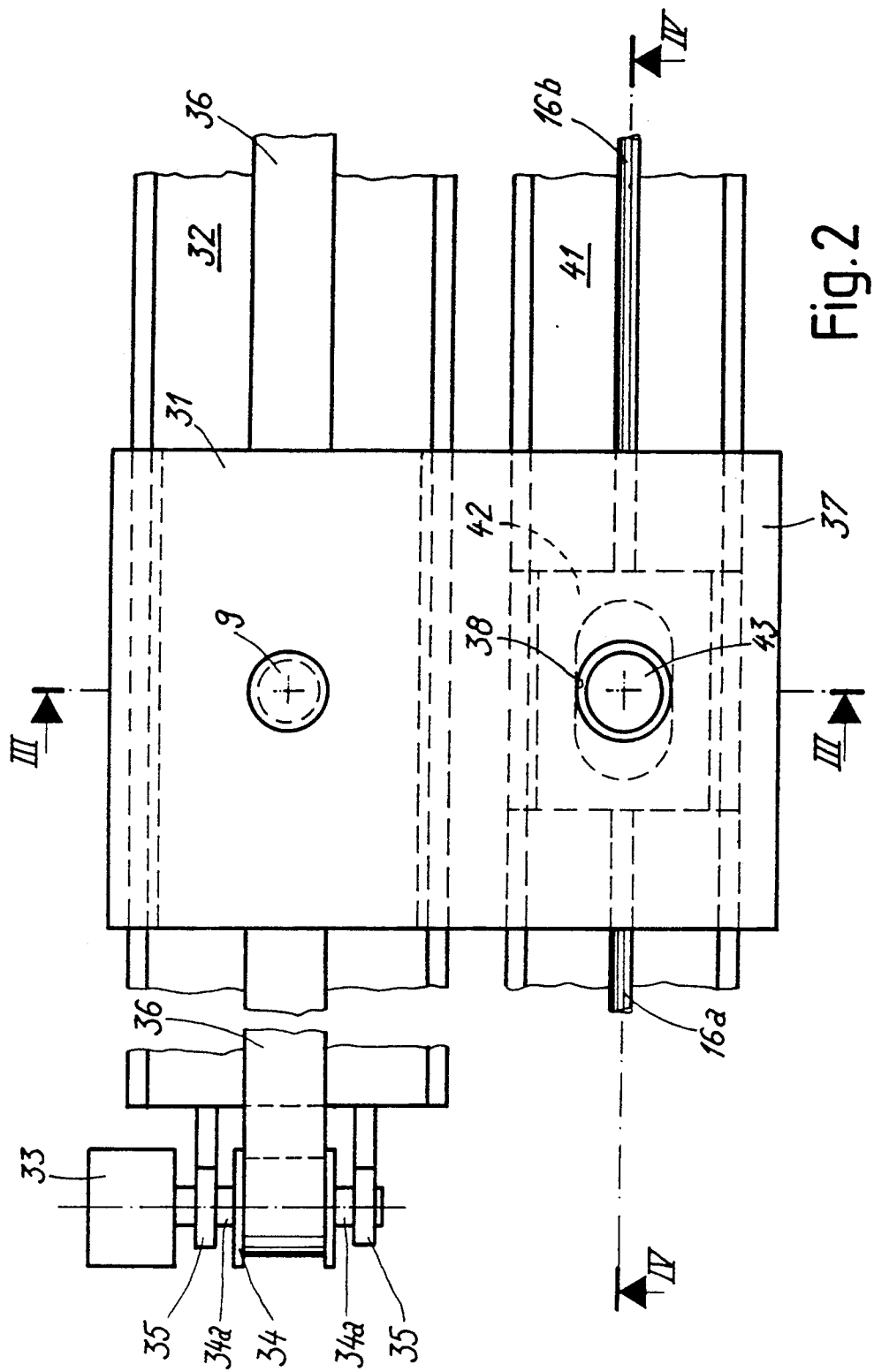
FIG. 2 is a schematic plan view of part of the elements of a first embodiment of the FIG. 1 device.
Figure 3:
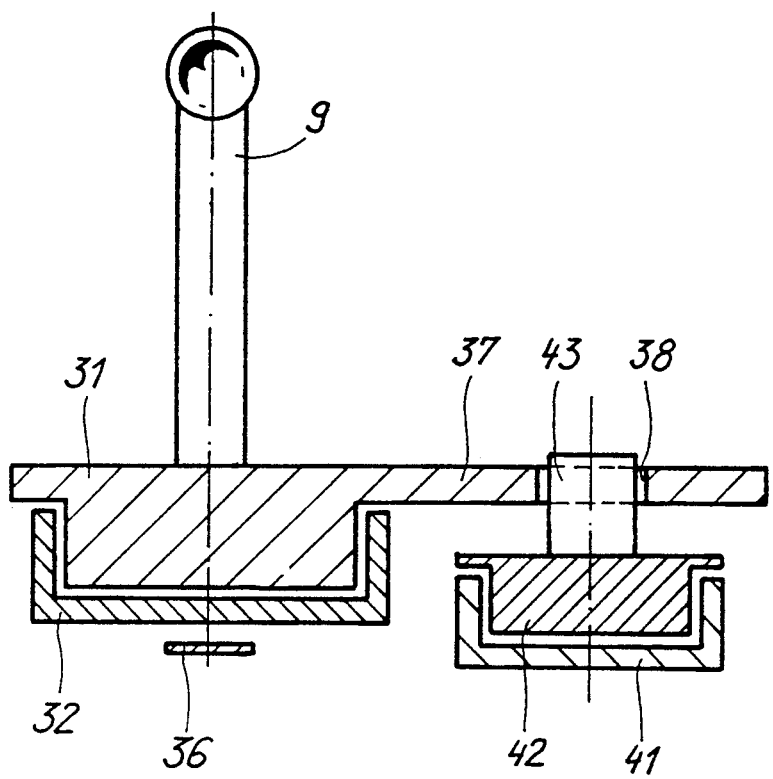
FIGS. 3 and 4 are schematic sectional views of the FIG. 2 device, respectively taken along line III—III and line IV—IV of FIG. 2.
Figure 4:
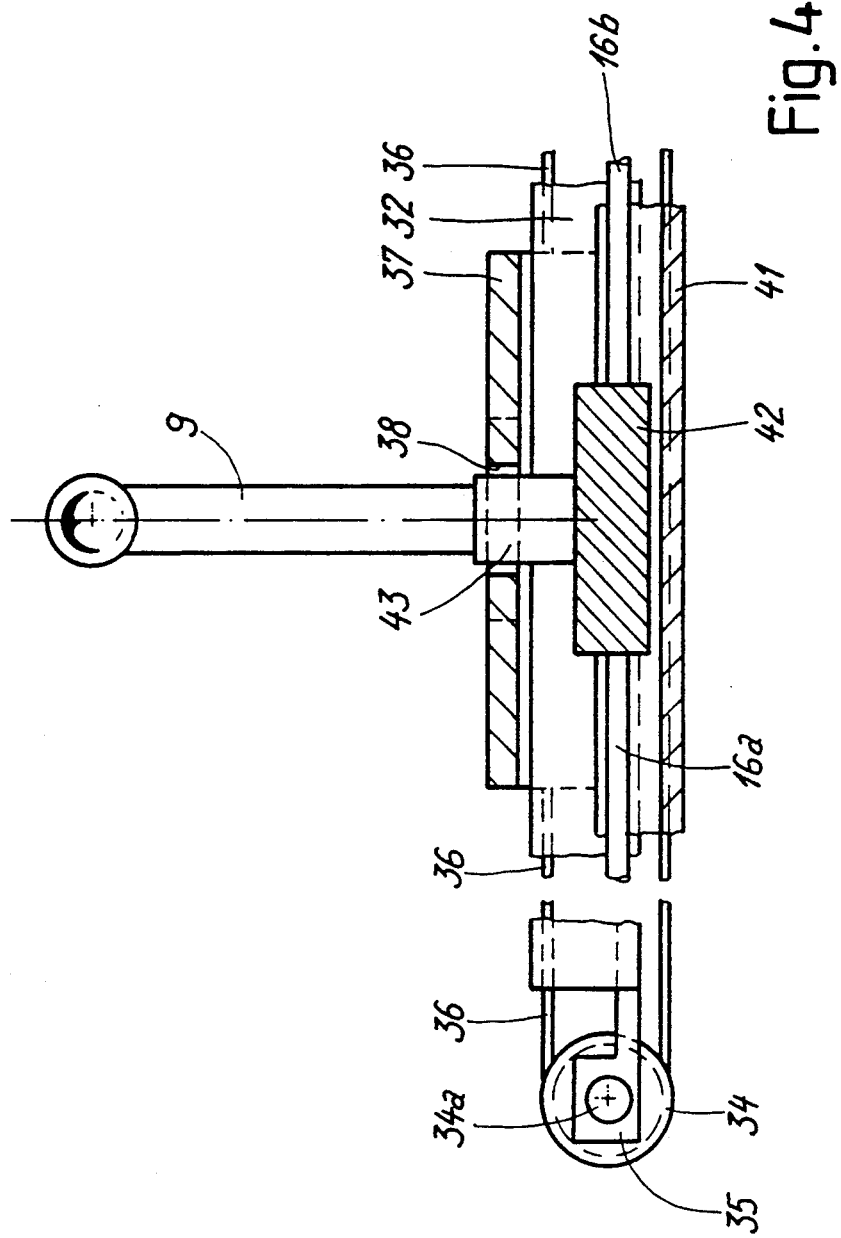

In the embodiment of the FIG. 1 device, that is partially and schematically represented in FIGS. 2 to 4, the stick 9 that is actuated by the vehicle's driver to steer the vehicle is fixed rigidly, in a manner that has not been shown, to the upper surface of a slide 31 which constitutes the support that is designated by reference 10 in FIG. 1.

Slide 31 is mounted in a slideway 32 so that it can only move lengthwise of slideway 32, the latter being secured to a support, not shown, arranged for example in one of the elbow-rests of the vehicle driver's seat. The means for maintaining and guiding the slide 31 in slideway 32 have not been shown either as they may consist of any of the means well known to the specialists in this field.

The position sensor of stick 9, referenced 11 in FIG. 1, consists in this example of a cylindrical potentionmeter 33 whose cursor is solid with the shaft 34a of a pulley 34. Shaft 34a rotates in bearings 35 that are fixed, in a manner not shown in detail, to one end of slideway 32.

The mechanical link between potentiometer 33 and slide 31 is provided by a belt 36 whose two ends are secured to slide 31 in a manner not shown and which extends over pulley 34 and over another pulley, also not shown, similar to pulley 34 and secured to the other end of slideway 32.

Slide 31 is extended laterally by a plate 37 having a housing 38 formed, in this example, by a cylindrical hole extending through plate 37. Plate 37 is shown to be integral with slide 31 but can of course not be integral with slide 31 and be rigidly fixed to the latter.

A slideway 41 is provided beneath plate 37, some distance away from the latter, with its longitudinal axis parallel to that of slideway 32. Slideway 41 may be fixed for example to the same support as slideway 32.

A slide 42 is so mounted in slideway 41 as to be able to move only lengthwise of slideway 41. The means for maintaining and guiding slide 42 in slideway 41 have not been shown as they may consist of any one of the many means well known to the specialists in this field.

A cylindrical stem 43 having a diameter less than that of housing 38 is fixed to the upper surface of slide 42, at right angles to this surface, and extends at least partially through housing 38.

It should be noted that, as will become clear later in this description, housing 38 and stem 43 are not necessarily cylindrical, and that one and/or the other may perfectly well have some other shape. Housing 38 may in fact consist of a notch of appropriate shape formed in the edge of plate 37, the latter then having a width less than that shown in FIG. 2.

Slide 42, which constitutes the coupling member referenced 13 in FIG. 1, is connected to rack 3 by cables 16a and 16b, also shown in FIG. 2, each having one end secured to slide 42 in a manner not shown.

In this embodiment, slaving device DA and the geartrain that connects motor 7 to rack 3 are so arranged that, when slaving device DA is working properly, any movement of stick 9 causes slide 42 to move not only in the same direction as stick 9 but also to the same extent as the latter.

As a result, while slaving device DA is operating properly, stem 43 remains concentric with housing 38 and does not contact the edges of the latter however stick 9 moves. Any movement of stick 9 thus causes wheels 1 and 2 to pivot via slaving device DA, without there being a mechanical link between stick 9 and wheels 1 and 2.

When slaving device DA is not working properly, the movements of stick 9 no longer cause wheels 1 and 2 to pivot and slide 42 no longer moves in the same direction and/or to the same extent as stick 9. Stem 43 thus comes to bear against one or other side of housing 38, thereby mechanically connecting plate 37, and hence slide 31 and stick 9, to slide 42 and to wheels 1 and 2 via cables 16a and 16b, rack 3 and steering rods 4 and 5. In other words, the mechanical link LM in FIG. 1 is here made up by stem 43 and housing 38.

The driver of the vehicle thus retains control over the latter's steering even when slaving device DA is not working properly.

It is possible that, in the event of faulty operation of slaving device DA, motor 7 is permanently energized and causes a force to be applied to stick 9 that is opposed to that having to be applied to stick 9 by the driver to steer his vehicle. To avoid this drawback, it is desirable to complete the device of FIG. 1 with the monitoring circuit 18 mentioned above and to adapt circuit 18 in a manner such that it is able to break the electric link between slaving circuit 12 and motor 7 upon detecting a faulty operation of slaving device DA whereby, in such a case, motor 7 is definitely no longer energized and does not oppose the force then having to be exerted by the driver on stick 9 to steer his vehicle.

The link between monitoring circuit 18 and slaving circuit 12 needed to perform this function is symbolized in FIG. 1 by a dashed line 18a.

Monitoring circuit 18 will not be described in greater detail as its design depends on the nature of the various elements of slaving device DA. Besides, such a monitoring circuit is well known to specialists. For the same reasons, the other monitoring circuits about to be mentioned below will not be described in detail either.

It may be difficult to adjust the various components of slaving device DA, in particular slaving circuit 12, in such a way that slide 42 always moves exactly at the same speed as stick 9 when the vehicle's driver is moving stick 9 and slaving device DA is working properly. It may therefore happen, while moving stick 9, that stem 43 comes to bear against the wall of housing 38 even when slaving device DA is working properly, something that may bother the vehicle's driver. In such a case, housing 38 may be given an elongated shape in the direction of movement of stick 9 and of slide 42 as shown in dashed lines in FIGS. 2 and 4.

In this case, the length of housing 38 must clearly be so determined that stem 43 will never come into contact with the wall of housing 38 as long as slaving device DA is working properly.

In such a case, when slaving device DA is no longer working properly, the vehicle's driver has obviously to move stick 9 over a certain distance before stem 43 engages the wall of housing 38 and before he resumes control over the steering of his vehicle. But if this distance is short, it can be travelled very quickly so that this lengthening of housing 38 does not generally give rise to any drawback.

Figure 5:
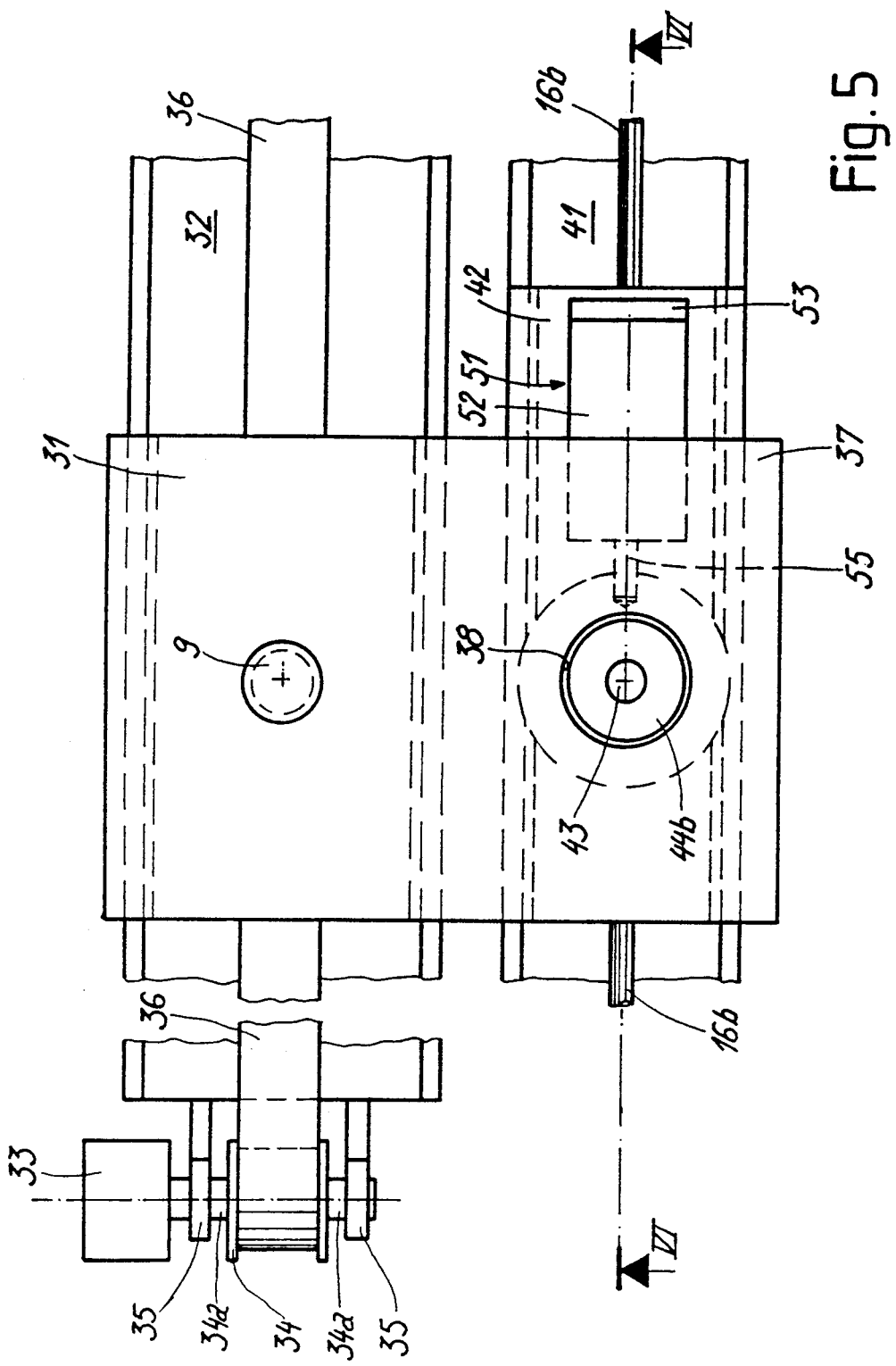
FIG. 5 is a partial schematic plan view of part of the elements of another embodiment of the FIG. 1 device.
Figure 6:
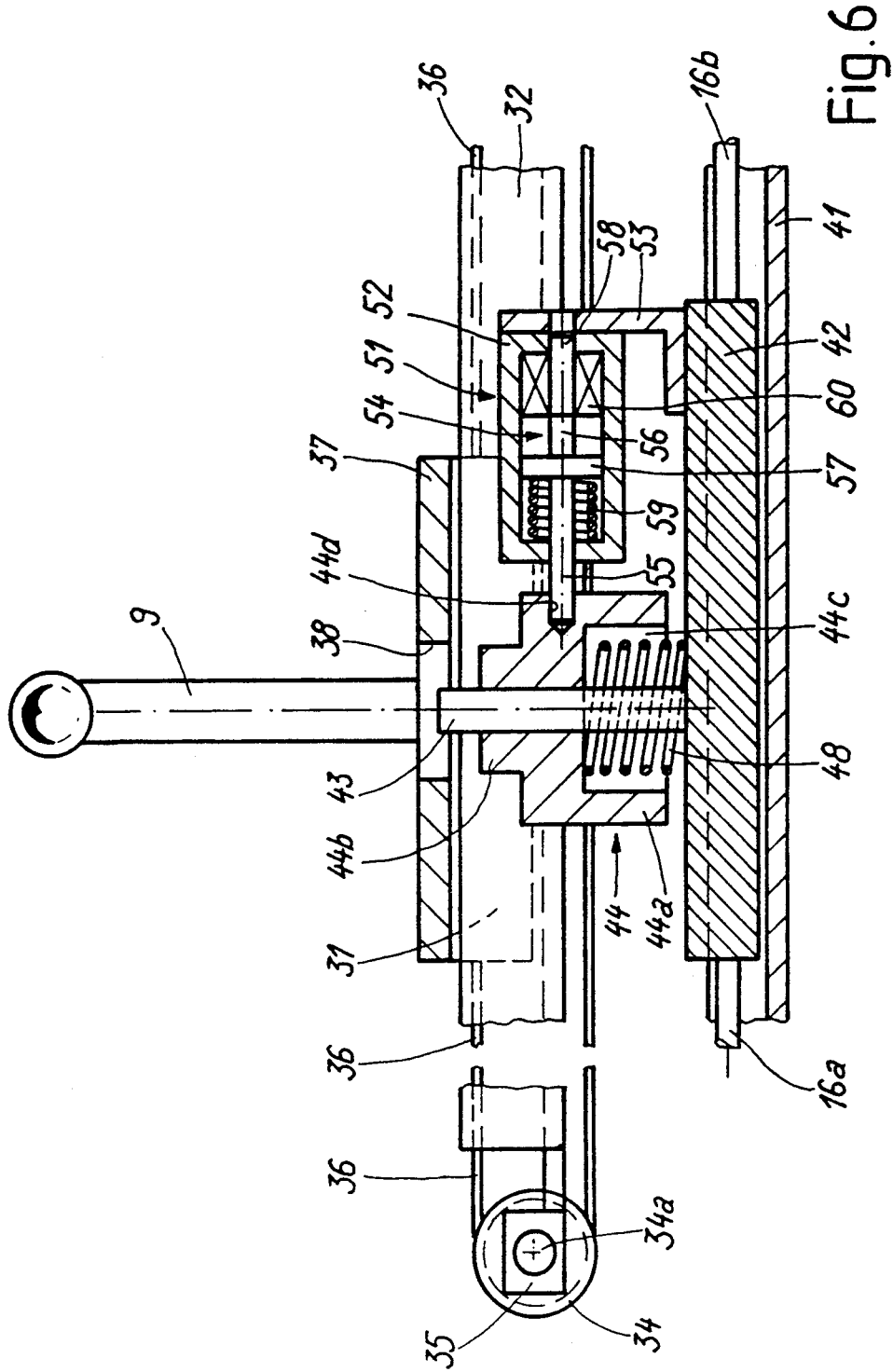
FIG. 6 is a schematic sectional view along line VI—VI of FIG. 5 in which the various elements are shown in the position they occupy when the slaving device is working properly.
Figure 7:
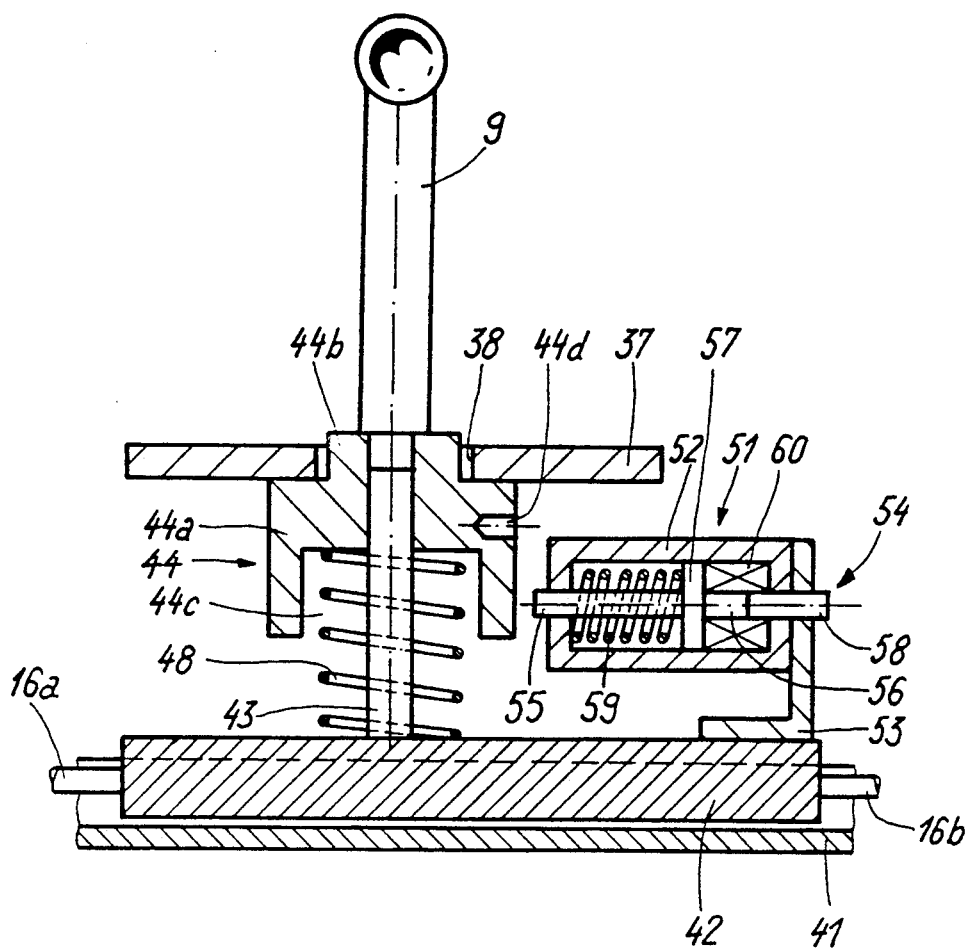
FIG. 7 is also a schematic sectional view along line VI—VI of FIG. 5 but in which the various elements are shown in the position they occupy in the event of faulty operation of the slaving device.

In the embodiment of the FIG. 1 device, shown partially and schematically in FIGS. 5 to 7, the various elements referenced 9, 16a, 16b, 31 to 38 and 41 to 43 are analogous to those similarly referenced in FIGS. 2 to 4 and will not again be described.

Besides stem 43, the mechanical linking means LM of FIG. 1 comprise here a coupling element 44 able to slide along stem 43 by virtue of a cylindrical hole extending therethrough and having a diameter slightly greater than that of stem 43.

Coupling element 44 has two cylindrical portions 44a and 44b both coaxial with stem 43. Portion 44a is adjacent slide 42 and its outer diameter exceeds that of housing 38. Portion 44b is adjacent plate 37 and its outer diameter is less than that of housing 38.

It should be noted that, in this case, housing 38 and portion 44b of coupling element 44 are also not necessarily cylindrical, but that either one and/or both may be differently shaped, the only condition being that portion 44b of coupling element 44 should be able to enter housing 38 in circumstances that will be described below. Stem 43 too may not be cylindrical, the central opening of coupling element 44 having then obviously to have a corresponding shape.

For a reason that will be made clear further on in this description, the overall height of element 44 is less than the distance between the top surface of slide 42 and the bottom surface of plate 37.

A spiral spring 48 is placed around stem 43 and compressed between the top surface of slide 42 and the bottom of a housing 44c formed in portion 44a of element 44.

Element 44 is held in the position illustrated in FIG. 6 by a locking member that will be described below, and is pushed by spring 48 to the position shown in FIG. 7 in circumstances that will also be described below.

The mechanical linking means LM of FIG. 1 further comprise an electromechanical locking member 51 that includes a cylindrical casing 52 fixed to slide 42 via a support 53 in a manner such that the axis of casing 52 intersects the axis of stem 43 at right angle.

The means for fixing casing 52 to support 53 and for fixing the latter to slide 42, which may be mere screws, have not been shown so as not unnecessarily to clutter up the drawings.

Locking member 51 further includes a bolt 54 partially housed in casing 52. Bolt 54 has a pair of cylindrical stems 55 and 56 that are coaxial with casing 52 and that are joined by a shoulder element 57 that is also cylindrical and coaxial with casing 52. For a reason that will become apparent later on in this description, stem 56, at least, is made of non-magnetic material.

Stem 56 is extended by another stem, 58, that is also cylindrical and coaxial with casing 52. Stem 58 has the same diameter as stem 56, but, unlike the latter, is made of a soft magnetic material, for a reason that will also become apparent further on.

Bolt 54 can move axially in casing 52 because the diameter of shoulder 57 is slightly less than the inner diameter of casing 52 and because holes are drilled in the ends of casing 52 to let through stems 55 and 58.

In the position shown in FIGS. 5 and 6, the tip of stem 55 projects into a blind hole 44d drilled in the outer wall of coupling element 44 thereby preventing element 44 from moving in the direction of plate 37 under the action of spring 48.

Locking member 51 moreover comprises a spiral spring 59 arranged in casing 52 around stem 55 and compressed between shoulder 57 and the bottom of casing 52 adjacent coupling element 44, and a coil 60 arranged at the other end of casing 52 and surrounding at least a portion of stem 58.

The inner diameter of coil 60 is slightly greater than the diameter of stems 56 and 58 such that the latter can move axially in circumstances that will be described below.

In this embodiment, the FIG. 1 device also comprises a monitoring circuit 18 which here is arranged to energize coil 60 as long as the operation of slaving device DA is correct, and to interrupt that energization as soon as it detects that this operation is faulty. To perform this function, monitoring circuit 18 is connected to coil 60 by conductors symbolized in FIG. 1 by the dashed line 18b. These conductors have not been shown in FIGS. 5 to 7.

Monitoring circuit 18, spring 59 and coil 60 are so dimensioned that, when bolt 54 is in the position shown in FIG. 6, where the tip of stem 55 is engaged into hole 44d of coupling element 44, and so long as slaving device DA is working properly and coil 60 is hence energized by monitoring circuit 18, the magnetic field produced by coil 60 is such that the force it exerts on stem 58 is sufficient to hold bolt 54 in this position against the force exerted by spring 59 on shoulder 57.

In this case, there is of course no mechanical link between stick 9 and the vehicle's wheels 1 and 2.

When monitoring circuit 18 detects a faulty operation of slaving device DA and interrupts the energization of coil 60, the magnetic field produced by coil 60 and the force exerted by that field on stem 58 disappear, and bolt 54 moves under the action of spring 59 to the position shown in FIG. 7. Stem 55 thus moves out of hole 44d thereby enabling spring 48 to push coupling element 44 into the position shown in FIG. 7 in which it mechanically connects plate 37, and hence stick 9, to wheels 1 and 2 via stem 43, slide 42, cables 16a and 16b, rack 3 and steering rods 4 and 5.

In this embodiment too it is of course necessary for the various elements of the FIG. 1 device to be so arranged that slide 42 will always move to the same extent as stick 9 when slaving device DA is working properly so that the portion 44b of coupling element 44 may enter housing 38 when monitoring circuit 18 detects a faulty operation of slaving device DA.

As in the case of the embodiment described above with reference to FIGS. 2 to 4, housing 38 can be given an elongated shape in the direction of movement of stick 9 and of slide 42 to avoid having to satisfy this condition strictly.

As set forth above, when slaving device DA is not working properly, the vehicle's driver must move stick 9 until stem 43 or coupling element 44 engages the wall of housing 38 to resume control over the steering of his vehicle.

The distance travelled by stick 9 is at worst equal to the length of housing 38 minus the diameter of stem 43 or of portion 44b of coupling element 44.

But it is not always possible and/or desirable to arrange the various elements of the FIG. 1 device such that coupling member 13 moves at least more or less to the same extent as stick 9 when slaving device DA is working properly.

It is then necessary for housing 38 to be long enough for stem 43 or coupling element 44 never to come into contact with one or other end of housing 38 when slaving device DA is working properly.

It follows that, in such cases, the distance over which the driver must move stick 9 to regain control over his vehicle's steering when slaving device DA is no longer working properly may be large enough for the vehicle no longer to be quite safe to drive.

FIGS. 8 to 12 illustrate schematically and partially an embodiment of the FIG. 1 device that enables this drawback to be avoided.

In FIGS. 8 to 12, the various elements referenced 9, 16a, 16b, 31 to 37, 41 to 44, 48 and 51 to 60 are similar to those bearing the same references in FIGS. 5 to 7 and will not be described again.

Moreover, in this embodiment, the FIG. 1 device comprises a monitoring circuit 18 fulfilling the same functions as those mentioned in connection with the embodiment described with reference to FIGS. 5 to 7.

In this embodiment, plate 37 is formed with a housing 71 of generally rectangular shape, having two sides perpendicular to the longitudinal axis of slideway 41. The other two sides of housing 71 are formed with regularly arranged teeth 72 separated by spaces 73. Teeth 72 are rectangular and all the same size, so that all those located on one side of housing 71 have their tips aligned on one another. Further, each tooth 72 on one side of housing 71 is located opposite another tooth 72 on the other side of housing 71.

In addition, a pin 74 extends radially through the portion 44a of coupling element 44, and its inner end engages in a groove 43a cut in stem 43, parallel to the axis of the latter, whereby element 44 cannot rotate about stem 43 but only slide along the latter. To this same end, it would also be possible to provide stem 43 and the hole extending through coupling element 44 with a non-cylindrical shape, what allows then to suppress groove 43a and pin 74.

Two other pins 75 and 76 are fitted on opposite sides of the portion 44b of element 44, in alignment with one another and on a diameter of portion 44b that is perpendicular to the longitudinal axis of slideway 41. The diameter of pins 75 and 76 is slightly less than the width of spaces 73 between teeth 72, and their length is such that the distance between their outer tips lies between distances d and D respectively separating the tips of a pair of facing teeth 72 on opposite sides of housing 71 and the bottoms of a pair of facing spaces 73 on opposite sides of housing 71.

Figure 9:
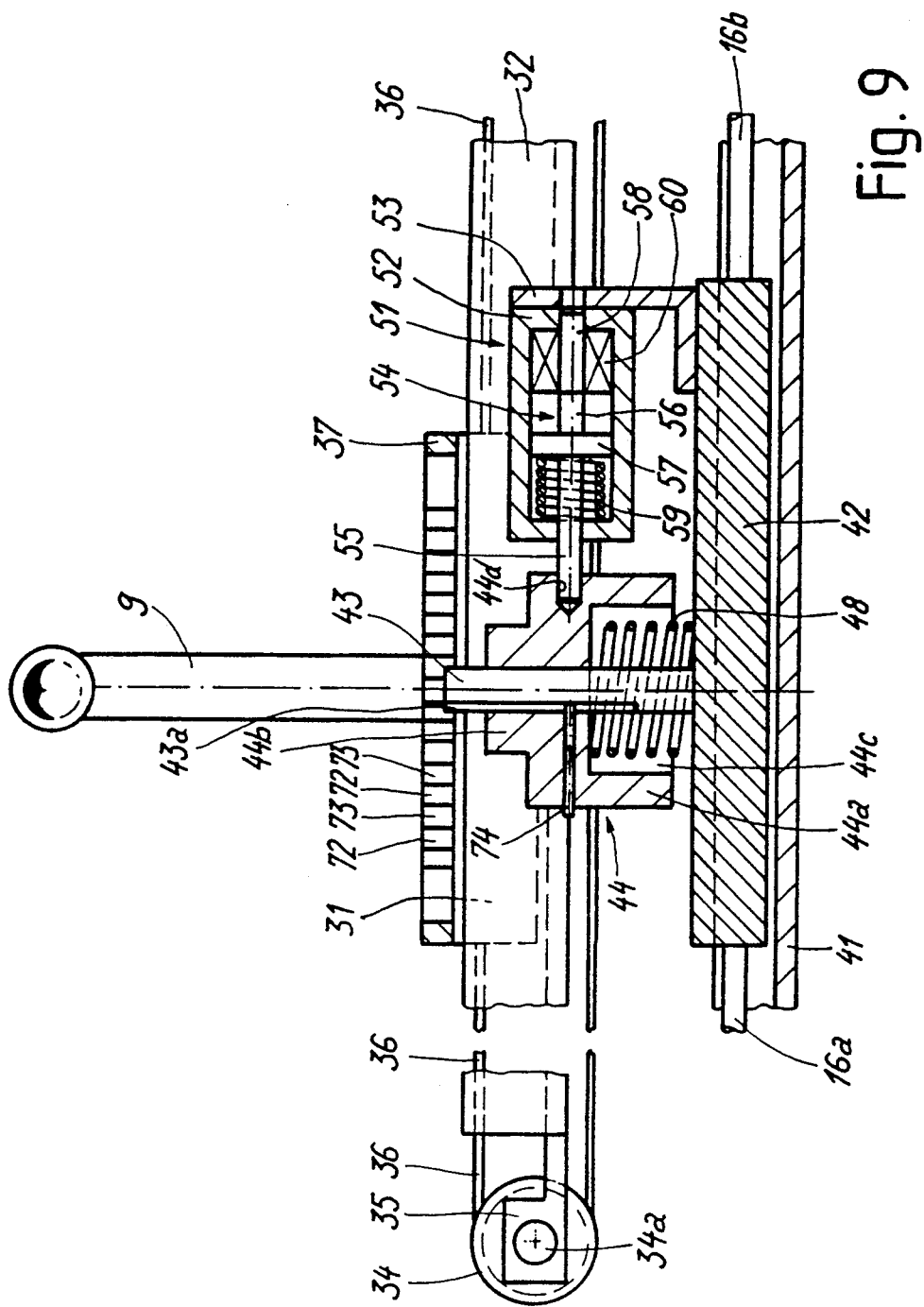
FIGS. 9 and 10 are schematic sectional views along lines IX—IX and X—X, respectively, of FIG. 8, in which the various elements are shown in the position they occupy when the slaving device is working properly.
Figure 10:
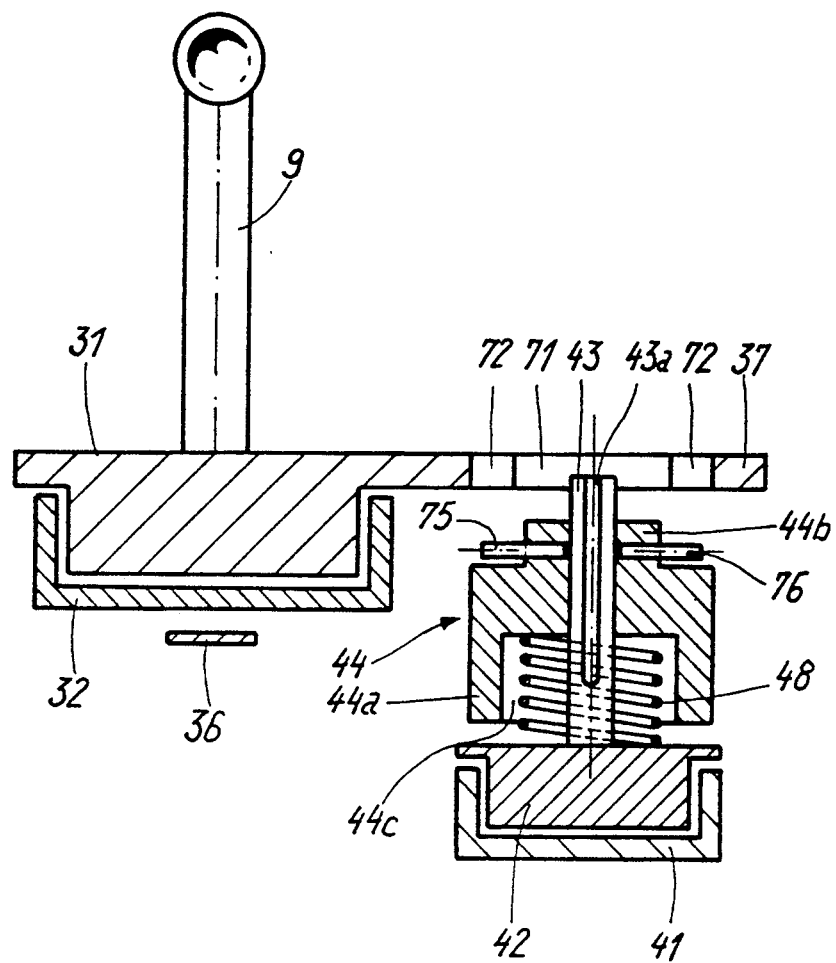

As in the embodiment described with reference to FIGS. 5 to 7, coupling member 44 is held in the position shown in FIGS. 9 and 10 by the stem 55 that projects into hole 44d so long as slaving device DA is working properly, and there is therefore no mechanical link between stick 9 and wheels 1 and 2.

Figure 11:
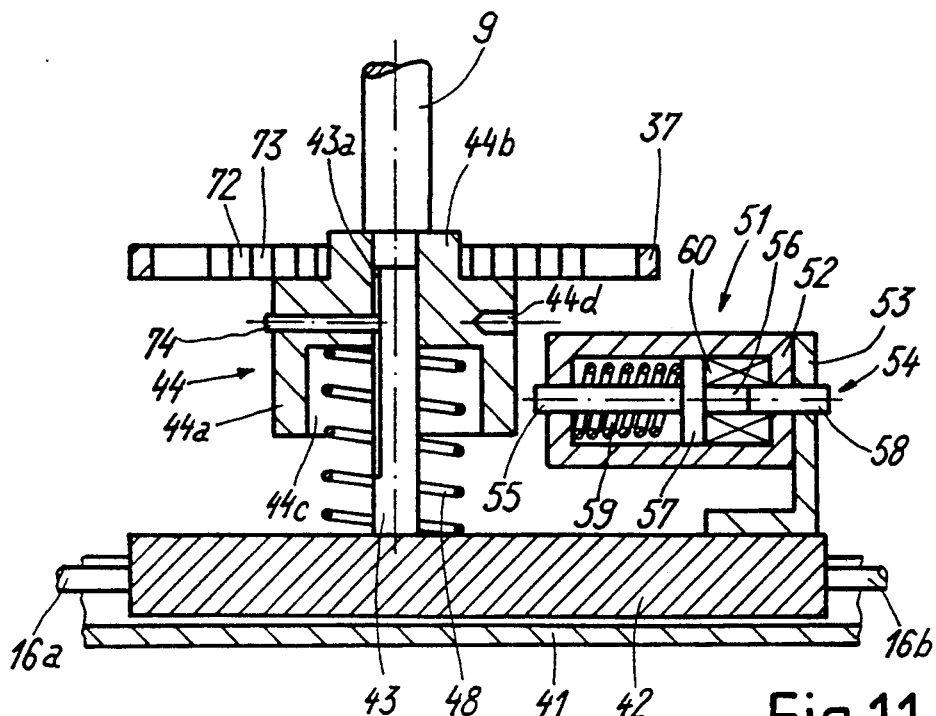
FIGS. 11 and 12 are also schematic sectional views along lines IX—IX and X—X, respectively, of FIG. 8, but in which the various elements are shown in the position they occupy in the event of faulty operation of the slaving device.
Figure 12:
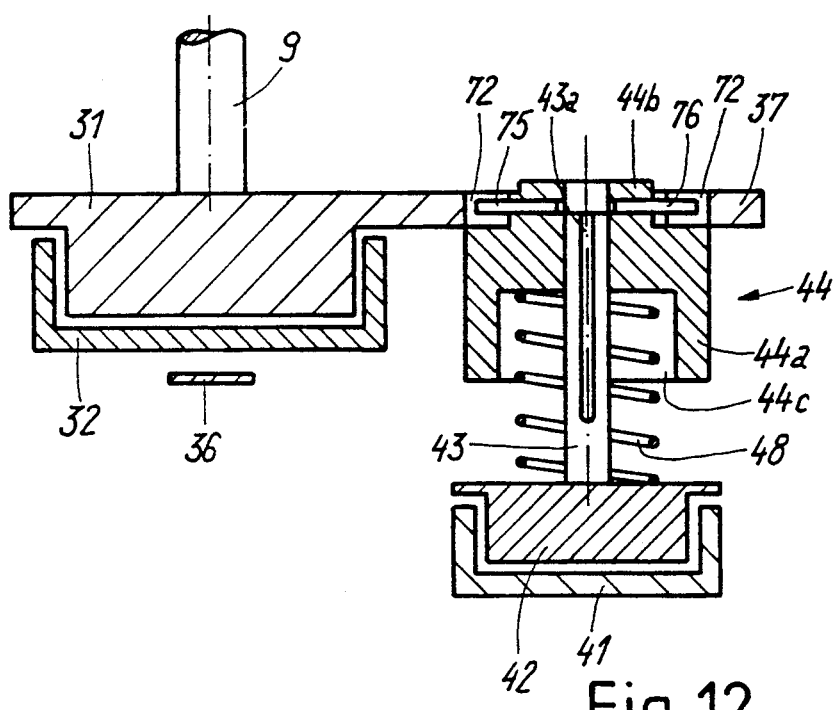

When slaving device DA is no longer working properly, monitoring circuit 18 cuts off coil 60's supply, thereby enabling bolt 54 and coupling element 44 to take up the position shown in FIGS. 11 and 12.

When coupling element 44 takes up this position, pins 75 and 76 each enter a space 73, possibly after the vehicle's driver having moved stick 9 slightly, regardless of the relative position of plate 37 and slide 42. As soon as pins 75 and 76 have each entered a space 73, stick 9 is mechanically linked to wheels 1 and 2 and the vehicle's driver resumes control of the vehicle's steering, as with the other embodiments described above.

To facilitate the introduction of pins 75 and 76 into spaces 73, the surfaces of teeth 72 that are facing slide 42 may be given a suitable shape, e.g. a V shape or that of a cylinder portion.

It will be observed that, in this embodiment, the extent to which the driver must move stick 9 to resume control over his vehicle's steering when slaving device DA stops working properly is at most equal to the sum of the width of one tooth 72 and of half a space 73. This movement is thus clearly less than in the case of the embodiments described with reference to FIGS. 2 to 4 and 5 to 7 when housing 38 is of elongated shape.

Figure 8:
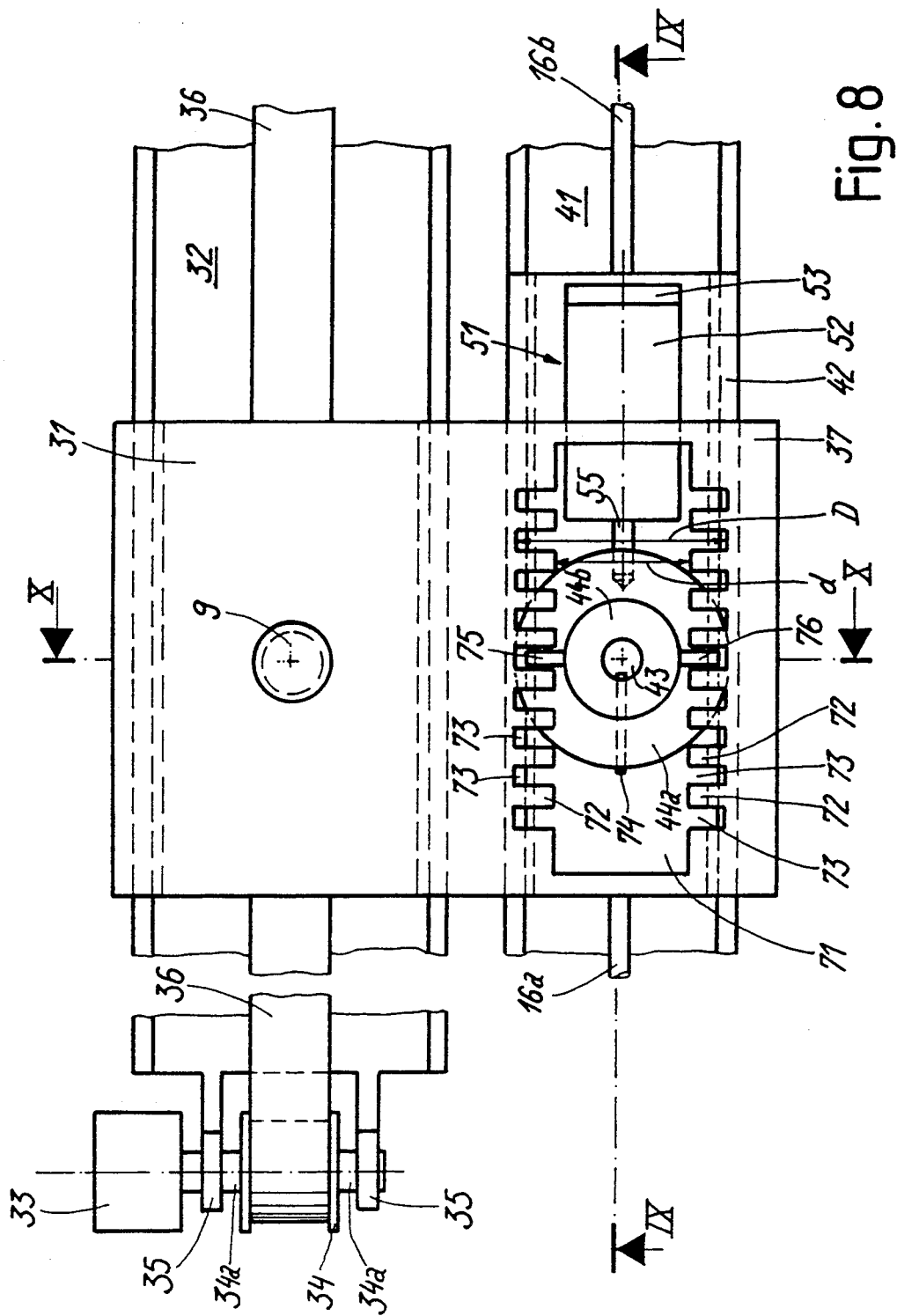
FIG. 8 is a schematic partial plan view of part of the elements of another embodiment of the FIG. 1 device.

In another embodiment, which has not been illustrated and which will not be described in detail as it is very similar to the embodiment just described, the housing in plate 37 has the same general rectangular shape as housing 71 in FIG. 8, but has only one series of teeth similar to teeth 72, all on the same side of the housing. Further, a single pin similar to pins 75 and 76 is fitted to coupling element 44, in a position such that it can be inserted between a pair of teeth of the above-mentioned series of teeth when coupling element 44 takes up the position it has in FIGS. 11 and 12.

In all of the described embodiments, stick 9 is linked mechanically to rack 3 when slaving device DA is not working properly.

The force that the driver then has to exert on stick 9 to steer his vehicle may thus be quite large, particularly when the vehicle is relatively heavy.

Figure 13:
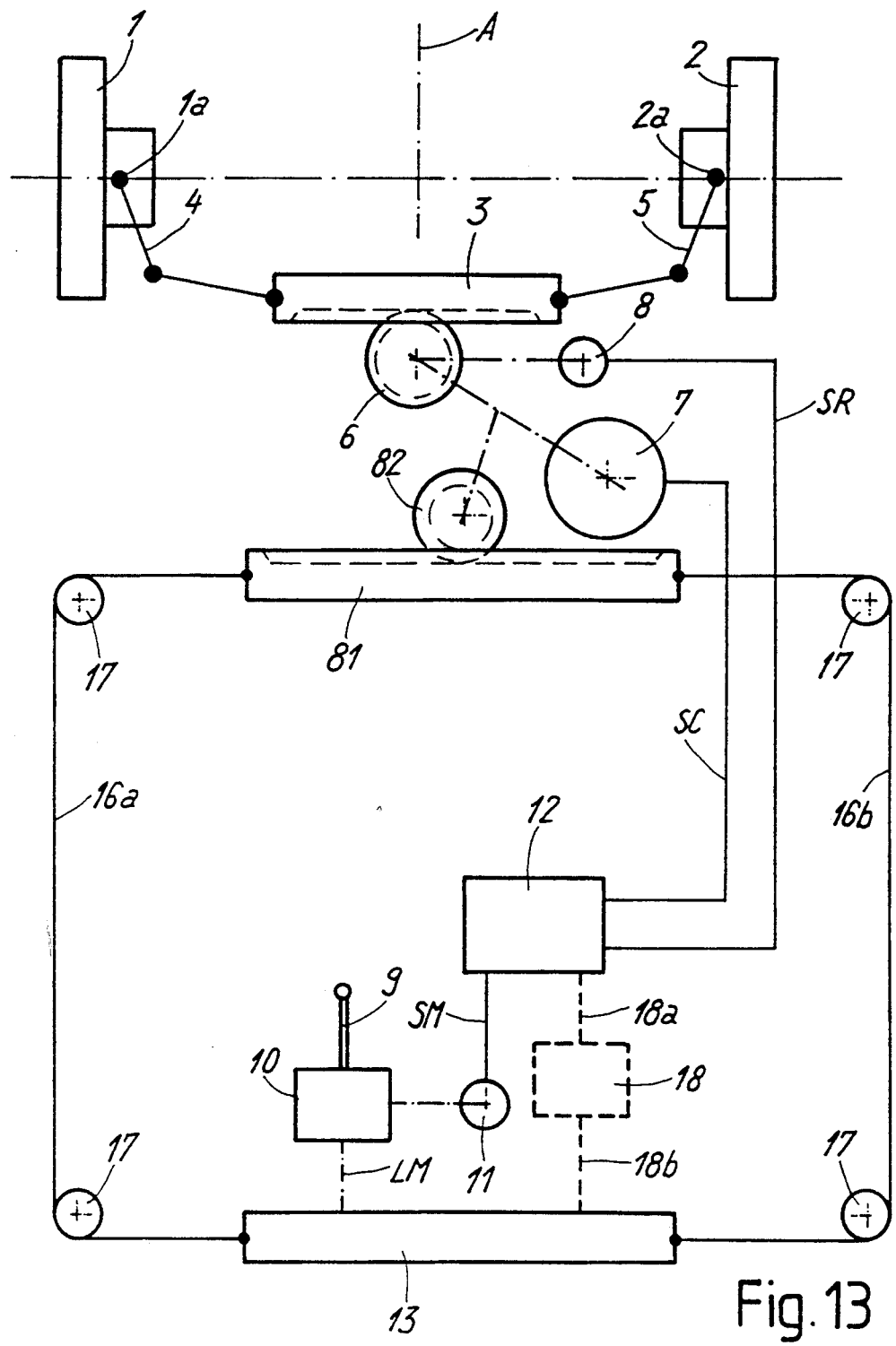
FIGS. 13, 14 and 15 schematically and partially show vehicles having other steering control devices according to the invention.

FIG. 13 illustrates schematically and partially a vehicle provided with an embodiment of the steering control device with which this force may be reduced.

The various elements referenced 1 to 13, 16a, 16b, 17 and 18 in FIG. 13 are similar to those bearing the same references in FIG. 1 and will not again be described.

It should be noted that, in FIG. 13, slaving device DA, made up of motor 7, sensors 8 and 11 and slaving circuit 12, has not been framed with dashed lines as in FIG. 1, so as not unduly to complicate FIG. 13.

In the control device of FIG. 13, coupling member 13 is not connected, by cables 16a and 16b, to rack 3, but is connected to an auxiliary rack 81 preferably arranged near rack 3.

The teeth of rack 81 mesh with those of a toothed wheel 82 which is itself mechanically connected to the rotor of motor 7, and hence to toothed wheel 6 and rack 3, by a gear-train symbolized by a chain-dotted line. In some cases, this latter gear-train may for instance simply consist of a portion of the gear-train that connects the motor 7's rotor to wheel 6. In other cases, wheel 82 may mesh directly with wheel 6, or may even be coaxial and solid with the latter.

In all cases, the mechanical linkages between motor 7's rotor, wheel 6 and wheel 82 are so adapted that each movement of rack 3 corresponds to a movement of greater magnitude of rack 81.

The force the driver has to exert on stick 9 to steer his vehicle when slaving device DA is not working properly is thus less than with the embodiments in which coupling member 13 is connected by cables 16a and 16b directly to rack 3, by a factor equal to the ratio between the movements of racks 3 and 81.

In this embodiment also, it is possible to adapt the various components in such a manner that, when slaving device DA is working properly, each movement of stick 9 brings about a movement of the same magnitude of coupling member 13. In such a case, coupling member 13 may be similar to those described with reference to FIGS. 2 to 7.

If it is not possible, or desired, to satisfy this condition, coupling member 13 may of course be similar to that described with reference to FIGS. 8 to 12.

Figure 14:
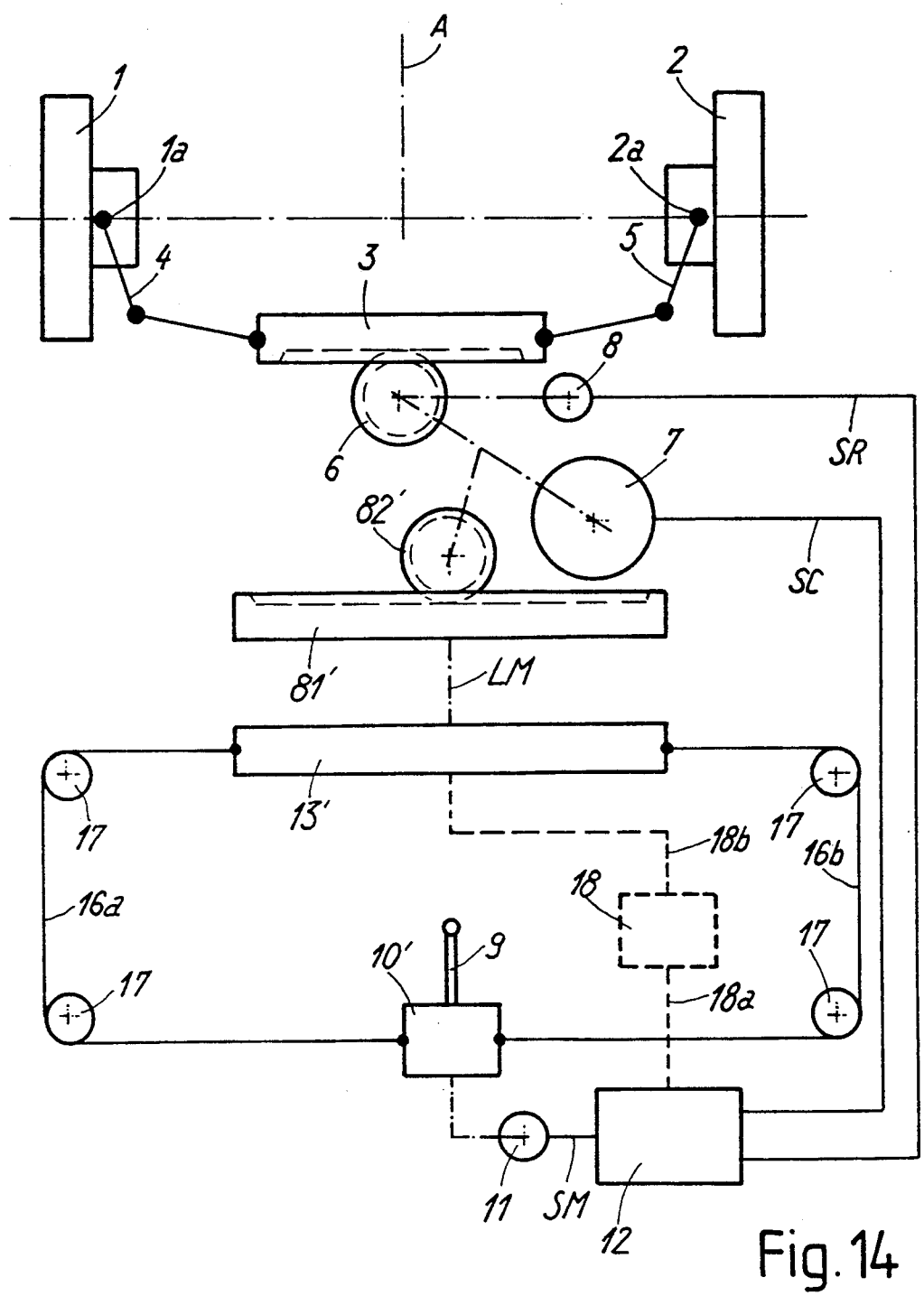

FIG. 14 illustrates schematically and partially a vehicle provided with another embodiment of the steering control device according to the invention.

The various elements shown in FIG. 14 and referenced 1 to 9, 11, 12, 16a, 16b, 17 and 18 are similar to those bearing the same references in FIG. 13 and will not be described again.

As in FIG. 13, and for the same reason, the slaving deice DA, made up of motor 7, sensors 8 and 11 and slaving circuit 12, has not been framed with dashed lines in FIG. 14.

In the embodiment shown in FIG. 14, the support for stick 9, referenced 10', travels in a slideway, not shown, like support 10 in the above-described embodiments, but support 10' is linked directly to one end of each of cables 16a and 16b. Support 10' furthermore has no element similar to plate 37 in the embodiments described hereinbefore.

As in the FIG. 13 embodiment, the steering control device of FIG. 14 comprises an auxiliary rack, referenced 81', meshing with a toothed wheel 82' connected mechanically to motor 7 and to rack 3.

The ends of cables 16a and 16b, opposite those secured to support 10', are connected to a coupling member, referenced 13', which travels in a slideway, not shown, arranged near rack 81' such that the directions of movement of coupling member 13' and of rack 81' are parallel.

Coupling member 13' may be similar to any one of those described above with reference to FIGS. 2 to 12. Further, rack 81' is solid with an element that is similar to plate 37 also described with reference to FIGS. 2 to 12 and which has, like plate 37, a housing into which a portion of coupling member 13' is engaged, or engages in case of improper operation of slaving device DA, thereby to connect mechanically stick 9 to rack 81' in such a case.

Clearly, a similar arrangement may be adopted when the steering control device has no auxiliary rack, like the device shown in FIG. 1. In such a case, the coupling member, which is similar to member 13' of FIG. 14, is arranged close to the single rack, and it is this rack that is solid with an element similar to plate 37 of FIGS. 2 to 12. Such an embodiment has not been illustrated.

In the embodiments described above with reference to FIGS. 1 to 13, coupling member 13 is connected to cables 16a and 16b and plate 37 provided with housing 38 or 71 is solid with support 10 of stick 9. In other embodiments, this arrangement is reversed, i.e. a coupling member, similar to coupling member 13, is solid with the support 10 of stick 9, and an element similar to plate 37 is secured to cables 16a and 16b. Such embodiments, which are obviously equivalent to the previous ones, have not been shown and will not be described in greater detail as their construction does not give rise to any particular problem.

In the case of the embodiment shown in FIG. 14, a similar reverse arrangement may be provided, i.e. a coupling member similar to member 13' may be solid with rack 81', or with rack 3 if rack 81' does not exist, an element similar to plate 37 being then secured to cables 16a and 16b. This arrangement has not been illustrated either and will not be described in detail.

Figure 15:
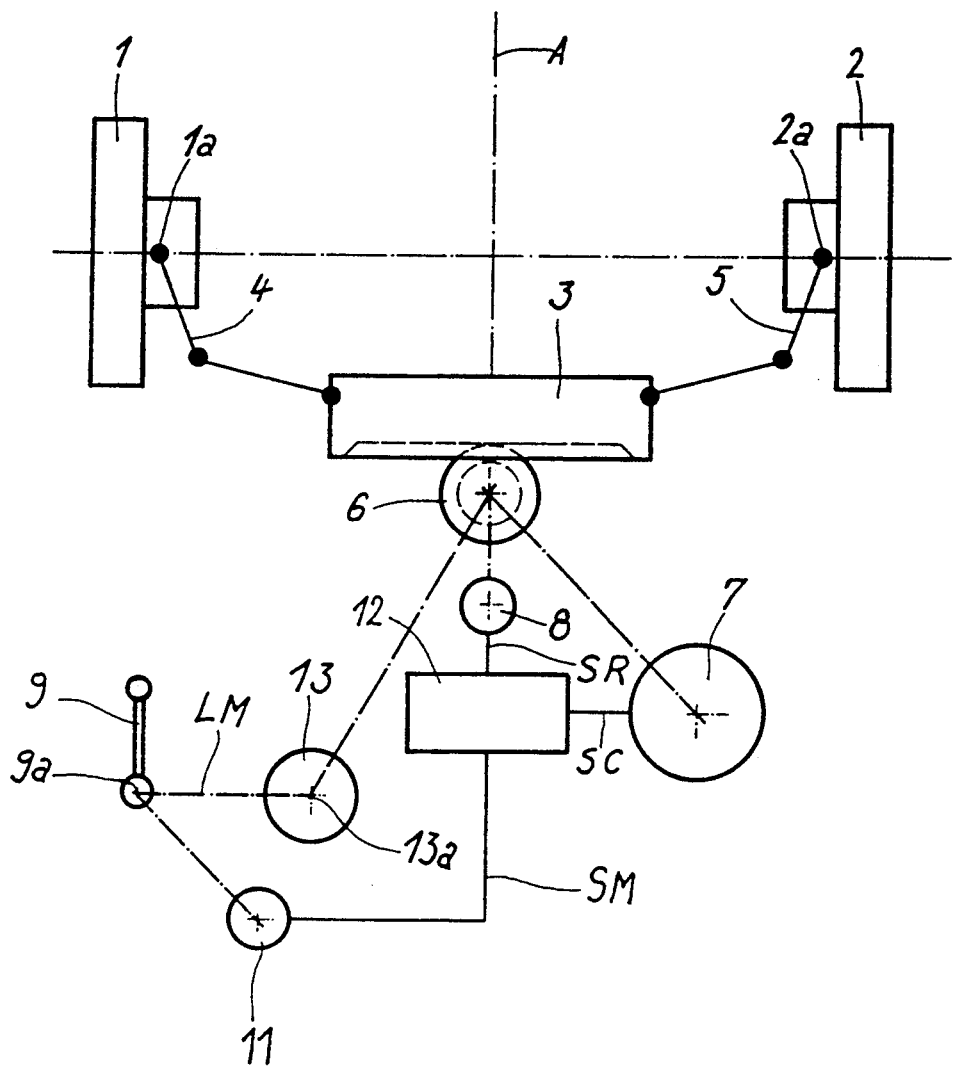

FIG. 15 illustrates schematically a vehicle comprising another embodiment of the steering control device according to the present invention.

The various elements referenced 1 to 8 and 11 in FIG. 15 are similar to those bearing the same references in FIG. 1 and will not again be described here.

As in FIGS. 13 and 14, and for the same reason, slaving device DA, made up of motor 7, sensors 8 and 11 and slaving circuit 12, has not been framed with dashed lines in FIG. 15.

In this embodiment also, the device according to the present invention also comprises a stick 9 and a coupling member 13 which are arranged close to one another and whose functions are similar to those of stick 9 and coupling member 13 in the above described embodiments.

But unlike these earlier embodiments, stick 9 and coupling member 13 are arranged and adapted to pivot about two axes respectively referenced 9a and 13a. As will become apparent later when describing one form of construction for elements 9 and 13, axes 9a and 13a are aligned with one another.

Coupling member 13 is coupled mechanically to toothed wheel 6, and hence to rack 3, by a gear-train which has not been shown but which is symbolized by a chain-dotted line, whereby it rotates about its axis 13a in response to each pivotal movement of wheels 1 and 2 about their axes 1a and 2a.

Sensor 11 for detecting the position of stick 9, and which is obviously mechanically connected to the latter, slaving circuit 12, motor 7, the gear-train that connects the latter to wheel 6 and the gear-train that connects wheel 6 to coupling member 13, are so arranged that when all these elements are working properly, each angular movement of stick 9 about axis 9a produces an angular movement of coupling member 13 about axis 13a having the same direction and the same magnitude. It will be noted that these angular movements occur without there being any direct mechanical link between stick 9 and coupling member 13.

As with the previously described embodiments, stick 9 and coupling member 13 of the FIG. 15 device are so arranged that a mechanical link is set up between them when slaving device DA is not working properly. This mechanical connection is also symbolized in FIG. 15 by a chain-dotted line referenced LM.

Figure 16:
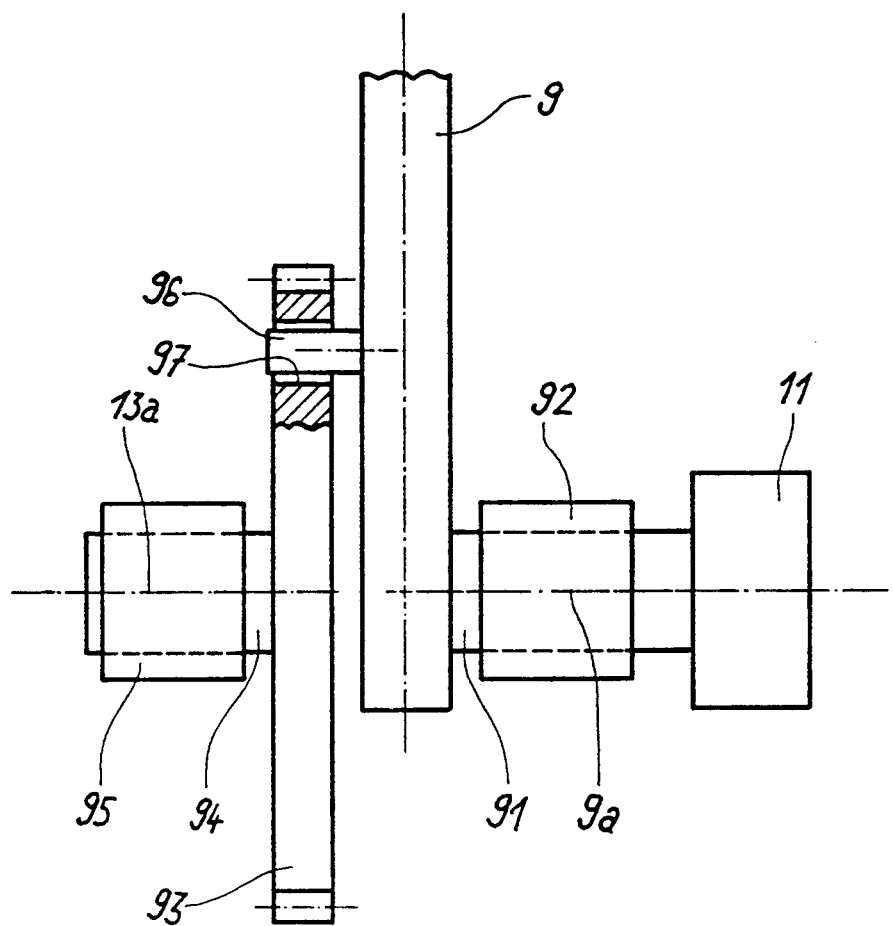
FIG. 16 is a schematic partial side view of part of the elements of the FIG. 15 embodiment of the device.
Figure 17:
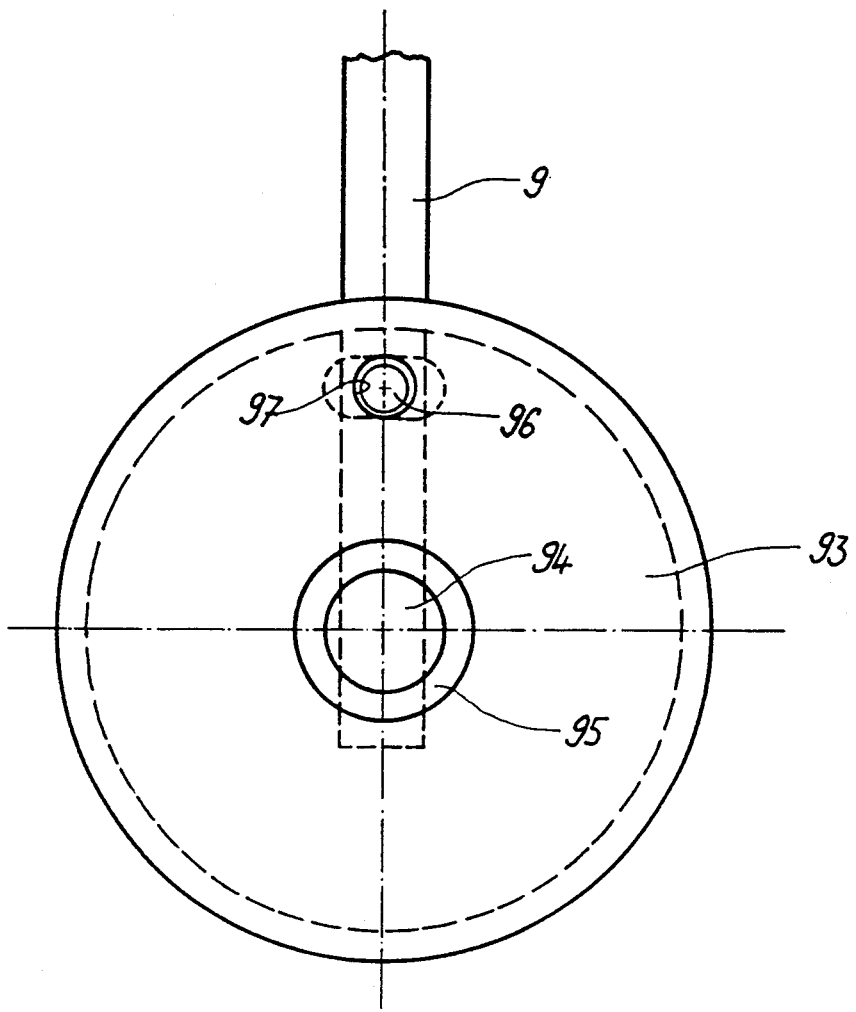
FIG. 17 is an end view of the elements shown in FIG. 16.

In the example illustrated schematically in FIGS. 16 and 17, stick 9 is fixed to one end of a cylindrical shaft 91 pivotally mounted in a bearing 92. The latter is itself mounted in, for example, one of the arm rests of the vehicle driver's seat in such a manner that the axis of shaft 91, which constitutes the pivotal axis 9a of stick 9, is substantially parallel to the vehicle's longitudinal axis A (FIG. 15).

The moving part of the position detector 11 of stick 9 is fixed to the other end of shaft 91.

Coupling member 13 consists of a toothed wheel 93 that is fixed to one end of a cylindrical shaft 94 pivotally mounted in a bearing 95.

The means for fixing these various elements to one another and in place have not been shown as they can be of very different natures and are well-known to specialists.

Bearing 95 is itself so mounted that the axis of shaft 94, which constitutes the pivotal axis 13a of coupling member 13 (FIG. 15), is in alignment with the pivotal axis 9a of stick 9, and that wheel 93 is located close to stick 9, but without being in contact therewith.

Toothed wheel 93 meshes with the first wheel, not shown, of the gear-train that connects it to toothed wheel 6 (FIG. 15).

A cylindrical stem 96 is fixed to stick 9 some distance away from axis 9a, by means not shown, in such manner that its axis is perpendicular to the pivotal plane of stick 9 and that it enters an opening 97 provided in wheel 93.

Opening 97 is also cylindrical, and its diameter is slightly larger than that of stem 96.

Further, the axes of stem 96 and of opening 97 coincide at least substantially and there is therefore no direct mechanical link between stick 9 and wheel 93 as long as slaving device DA is working properly, as, in this case, each pivotal movement of stick 9 produces a pivotal movement having the same direction and same magnitude as the coupling member formed by wheel 93.

But if slaving device DA is not working properly and the vehicle's driver pivots stick 9, stem 96 comes into contact with the wall of opening 97 thereby establishing the above-mentioned mechanical link LM between stick 9 and coupling member 13. The force exerted on stick 9 is then transmitted to rack 3 via wheel 93 and the gear-train which connects the latter to wheel 6. The driver thus retains control over his vehicle's direction of movement.

For a reason similar to that mentioned earlier when describing the FIG. 2 device, opening 96 may be given an elongated shape as shown in dashed lines in FIG. 17.

Clearly, in a device such as the FIG. 15 device, the mechanical link LM between stick 9 and coupling member 13 in case of improper operation of slaving device DA may also be provided by elements similar to those described with reference to FIGS. 5 to 12.

Clearly also, the mechanical link between the coupling member 13 of the FIG. 15 device and wheel 6 may be provided by means other than a gear-train, e.g. a series of pulleys connected by, preferably notched, belts.

Many other modifications may still be made to the steering control device according to the invention without departing from the scope of the invention. In particular, the coupling member and the element with which it cooperates to mechanically connect stick 9 to the vehicle's steerable wheels may be made very differently from the ways described, while still fulfilling the same function.

Clearly too, the present invention also applies to a vehicle having only one steerable wheel, or a number of steerable wheels greater than two, and to a vehicle in which the steering control member does not consist of a stick such as stick 9 but, for instance, of a steering wheel.

What we claim is:

1. A steering control device for a vehicle having at least one steerable wheel that is angularly pivotable about a pivotal axis, said steering control device comprising:

a steering control member actuatable by a driver of said vehicle;

a slaving device for electrically slaving the angular position of said wheel about said pivotal axis to the position of said steering control member;

a first mechanical member mechanically coupled to said steering control member;

a second mechanical member mechanically coupled to said wheel by a mechanical coupling means;

an opening defined by a wall being provided in one of said first and second mechanical members;

said first and second mechanical members being disposed with respect to each other such that said wall in said one of said first and second mechanical members always surrounds the other of said first and second mechanical members;

said mechanical coupling means being so arranged and said opening and said other of said first and second mechanical members being shaped such that, when said slaving device functions properly, pivoting of said wheel by way of said slaving device in response to actuation of said steering control member causes said second mechanical member to be so displaced that said wall and said other of said first and second mechanical members do not engage with each other, and that, in case of faulty operation of said slaving device, actuation of said steering control member causes said other of said first and second mechanical members and said wall to engage with each other for displacing said second mechanical member and consequently causing said wheel to pivot about said axis by way of said mechanical coupling means.

2. A steering control device according to claim 1, wherein said steering control member is pivotable about a second pivotal axis, said first mechanical member comprises a stem extending from said steering control member said stem being spaced from and parallel to said second pivotal axis, said second mechanical member is rotatable about a rotation axis which is at least substantially aligned with said second pivotal axis, and said opening is provided in said second mechanical member for said wall surrounding said stem.

3. A steering control device according to claim 2, wherein said stem and said opening are cylindrical.

4. A steering control device according to claim 2, wherein said opening is elongated along an arc of a circle centered on said rotation axis.

\* \* \* \* \*